United States Patent [19]
Tobias

[11] 3,768,737
[45] Oct. 30, 1973

[54] GRANULAR MATERIAL SPREADER

[76] Inventor: James R. Tobias, R. D. 1, Halifax, Pa. 17032

[22] Filed: Sept. 5, 1972

[21] Appl. No.: 286,207

[52] U.S. Cl.................. 239/666, 239/675, 239/676, 239/677
[51] Int. Cl............................................. A01c 15/00
[58] Field of Search................... 239/675, 676, 679, 239/677, 666, 672, 674, 687

[56] References Cited
UNITED STATES PATENTS

| | | | |
|---|---|---|---|
| 2,988,368 | 6/1961 | Kerr | 239/674 X |
| 3,160,964 | 12/1964 | Boyer et al. | 239/675 X |
| 3,322,429 | 5/1967 | Cervelli | 239/677 X |

Primary Examiner—M. Henson Wood, Jr.
Assistant Examiner—John J. Love
Attorney—Arthur E. Dowell, Jr. et al.

[57] ABSTRACT

A quick-change granular-material spreader adapted to fit standard dump truck bodies through the chute openings in their tail gates, and including an auger feed and spinner plate rotated by an hydraulic motor from a pump driven by the truck's own engine, the feed rate of the granular material and the distance it is broadcast being manually adjustable, and this rate also being affected by the rotation rate of the truck's engine, which is in turn affected by the gear in which the truck is presently being driven.

7 Claims, 6 Drawing Figures

PATENTED OCT 30 1973 3,768,737

GRANULAR MATERIAL SPREADER

This invention relates to mobile spreaders of the type used to broadcast granular materials such as cinders, sand, or salt crystals from a moving vehicle for the purpose of uniformly scattering the granular material, for instance, as an anti-skid measure on a slippery highway.

In most of the areas where the spreading of such materials is used to combat slippery road surfaces, the need for such treatment of the highways arises only intermittently when a snow or sleet storm occurs, and in the meanwhile it is very desirable to be able to use the same vehicles for other purposes. Thus, quick conversion of vehicles for spreading service, followed by quick removal of the spreaders from the vehicles after the snow emergency has passed is very important.

It is the principal object of this invention to provide an improved spreader of granular materials which can be quickly installed in, or removed from, highway department trucks, and in particular to provide a rugged, inexpensive and efficient spreader which will fit the bodies of most standard dump trucks without requiring modification thereof except to the extent of bolting or welding several minor parts thereto.

Another major object of the invention is to provide a material spreader which is virtually a unitary assembly, and which can be slid into a dump truck body to protrude through the standard chute opening in the tailgate, and which can then be easily secured to the truck body and/or tailgate to hold it in place while spreading granular material carried in the body.

Another important object of the present invention is to provide an improved spreader which includes an hydraulic motor which drives both the auger material feed and also the spinner plate that slings the granular material outwardly from the vehicle. Standard dump trucks manufactured in the United States include a power take-off from the engine which is used to drive an hydraulic pump to which the hydraulic spreader motor of this system is connected using quick-detach hydraulic line connectors to facilitate easy installation and removal of the spreader. The hydraulic spreader motor may, of course, alternatively be connected to an hydraulic power source built into a truck so equipped.

It is a further important object of the invention to provide a novel and improved means for controlling the rate of delivery of the granular material by the spreader by manual means which is separate from varying the rotation rate of the hydraulic feed motor, the present improved control is done by varying the size of the openings through which the granular materials reach the auger, this adjustment also serving to control the maximum size of the particles which can enter into the spreader assembly, thereby to prevent damage thereto or clogging. The present control is provided with convenient crank means for adjusting these openings from a point outside of the truck body which is easily accessible to an operator.

Yet another object of the invention is to provide baffle means for adjusting the distance through which the spreader slings the granular material transversely of the direction of movement of the truck, i.e. across adjacent traffic lanes, this means also being of simple structure and being easily accessible for manual adjustment externally of the vehicle body.

Other objects and advantages of the invention will become apparent during the following discussion of the drawings, wherein.

Figure 1:
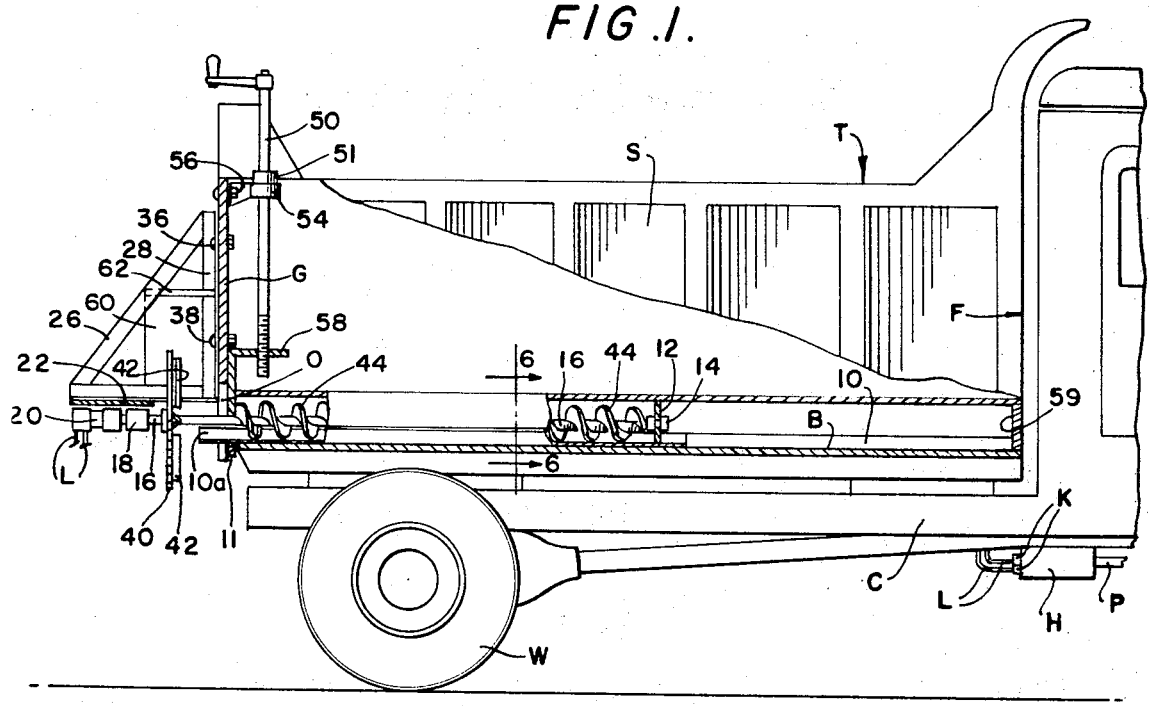
FIG. 1 is a view of the rear portion of a standard dump truck, partly in cross section, showing a spreader according to the present invention installed in the body.

Referring now to the drawings, FIG. 1 shows the rear portion of a dump truck T including a chassis C and including a dump body having sides S extending up from a bed portion B of the dump body. This body also includes a standard tailgate G having a chute opening O in its lower central area as can best be seen in FIG. 2. The vehicle of course also includes ground engaging wheels W and a power take-off shaft P driving an hydraulic pump H having hydraulic lines L extending rearwardly therefrom a pair of couplers K which are preferably of the quick-detach variety. These hydraulic lines L extend rearwardly along the chassis C and are again visible at the rear of the truck and extending therefrom to the rear of the spreader assembly which is about to be discussed. The length of the truck bed in a standard dump truck is 9 feet from the tailgate G to the forward end F of the truck body. The present spreader assembly is mounted on a channel member 10 which is disposed upright as can best be seen in FIGS. 1, 3 and 6. The length of the channel member 10 is slightly longer than the length of the truck bed B, and the back end 10a of the channel 10 extends outwardly just short of the slinger plate 40 as shown in FIG. 1. The forward end of the channel 10 is held between the truck bed B and a plate 59, FIGS. 1 and 3, which is welded to the truck body's front surface F and is shaped to fit into the channel 10. The rear end of the channel 10 has a steel strip 11 welded to it which lies against the rear edge of the truck bed B and is held thereagainst by the tailgate G on each side of its opening O. Somewhere toward the forward end of the channel 10 from the rear end thereof, there is a vertically disposed bearing plate 12, FIGS. 1 and 3, and this plate is welded to the channel 10 so that it stands upright therefrom in the position shown in FIG. 1. The plate 12 supports a bearing bushing 14 into which the forward end of the main shaft 16 extends, and the bushing rotatably supports the shaft 16 at its forward end.

The shaft extends rearwardly through the chute opening O and passes out of the truck body and through another bearing 18 which supports the rear end of the shaft just ahead of the hydraulic motor 20 which drives the shaft to cause it to rotate. The motor 20 and bearing 18 are suitably fixed to the underside of a supporting plate 22 as can be seen best in FIGS. 1 and 2 and this supporting plate is in turn removably bolted by bolts 21 and 23 to a pair of triangular frames 24 and 26 each of which includes three pieces, for instance, such as the horizontal piece 30, the vertical angle piece 32 and the diagonal piece 34 of the righthand triangular frame 24. The lefthand frame 26 is similar and likewise includes a vertical angle member 28, which like the angle member 32 is bolted to the tailgate G by bolts such as the bolts 36 and 38 shown as extending through the vertical angle member 28 and the tailgate G and held on the inside of the tailgate by nuts, FIG. 1. Thus, the triangular members 24 and 26 are secured to the tailgate G and in turn rigidly support the plate 22, the hydraulic motor 20 and the bearing block 18 which supports the rear end of the shaft 16.

Figure 5:
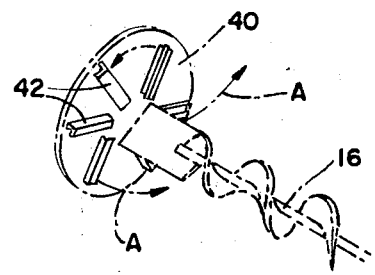
FIG. 5 is a view similar to FIG. 4 and on a smaller scale, but showing part of the lead screw feed of the assembly mounted on the shaft.

The shaft 16 supports the spinner disc 40 just behind the rear end 10a of the channel member 10, and this spinner disc is preferably provided with a few projections welded on its surface and in the present example comprising a series of radially extended pieces of angle iron 42 which improve the efficiency of the disc for the purpose of slinging the granular material radially outwardly therefrom, for instance, as shown by the arrows A in FIG. 5. The shaft 16 also supports a lead screw-type conveyor or auger 44 which can be seen in FIGS. 1, 2, 3 and 5. The auger, like the spinner disc 40 is attached to the shaft 16 and rotates whenever the shaft rotates. The rotation of the shaft 16 when viewed from the rear of the truck is clockwise so as to move the granular material between the convolutions of the auger toward the rear of the truck and discharge it into the spinner disc 40.

Figure 3:
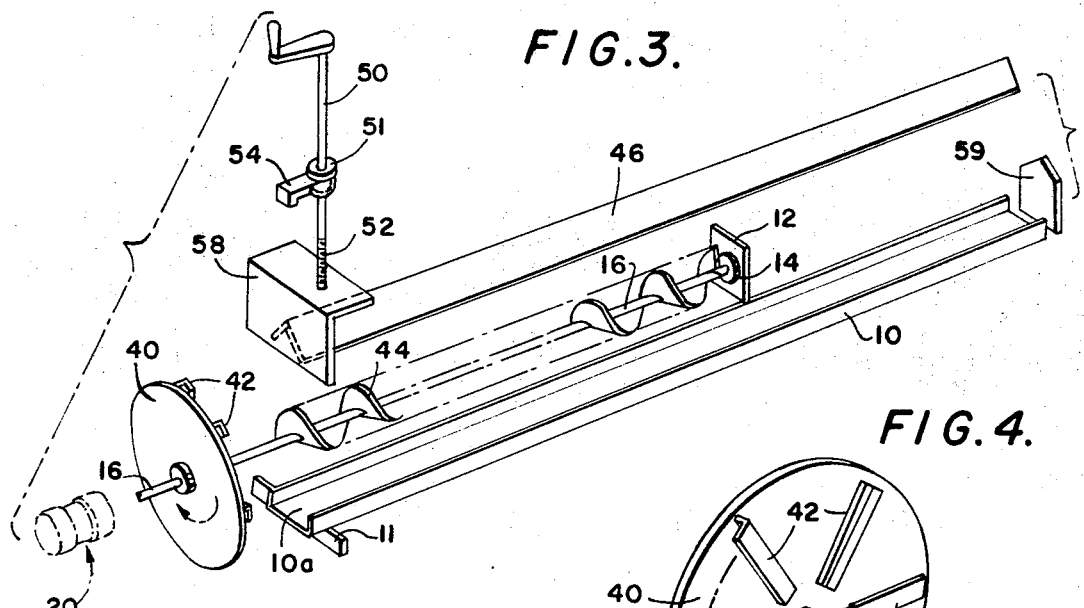
FIG. 3 is an exploded perspective view of the feeding mechanisms of the spreader assembly.
Figure 4:
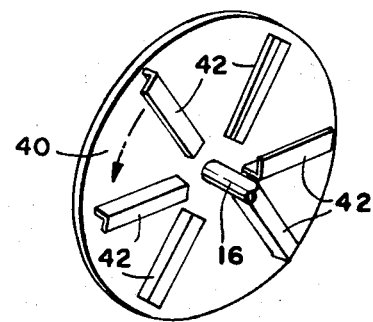
FIG. 4 is a view of the face of the spinner plate mounted on the drive shaft of the spreader assembly.
Figure 6:
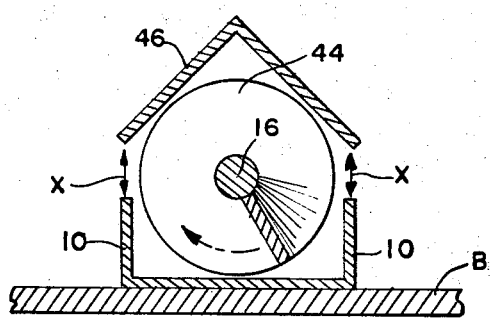
FIG. 6 is an enlarged sectional view taken on line 6—6 of FIG. 1.

As can best be seen in FIGS. 1, 3 and 6 the assembly also includes an inverted angle plate comprising an elongated cover 46 which overlies the auger 44 but does not contact the upwardly extending flanges on the sides of the channel 10. Therefore, granular material can sift down from above the cover plate 46 and enter into the axial auger conveyor through the slot openings which are labelled X in FIG. 6 and which are located on both sides of the channel 10. Of course, the height of these openings X affects the rate at which material will enter the auger and be fed toward the rear of the truck and also controls the maximum size of these granular materials which can pass through the openings to the auger. This height is controlled by a mechanism shown in FIGS. 1, 2 and 3 for raising or lowering the cover plate 46. The control comprises a vertical rod 50 which has a threaded lower portion 52 passing through a clearance hole in a guide bracket 54 secured to the tailgate of the truck by bolts 56. A collar 51 is pinned to the shaft 50 above the bracket 54 to prevent vertical downward movement of the shaft in the bracket 54. The shaft 50 extends vertically down behind the tailgate and its threaded lower end 52 engages threads within an angle bracket 58 which is secured to the cover plate 46, FIG. 3, and can either raise or lower the front end of the angle plate with respect to the auger 44 and the channel member 10. The bracket 58 also closes the opening O in the tailgate G. The forward end of the cover plate 46 extends beyond the bearing plate 12 and abuts the front F of the dump body, lying on top of a small plate 59 welded to the body for that purpose. If desired, more positive means may be provided for attaching the forward end of the angle plate 46, but in practice it has not been found desirable.

Figure 2:
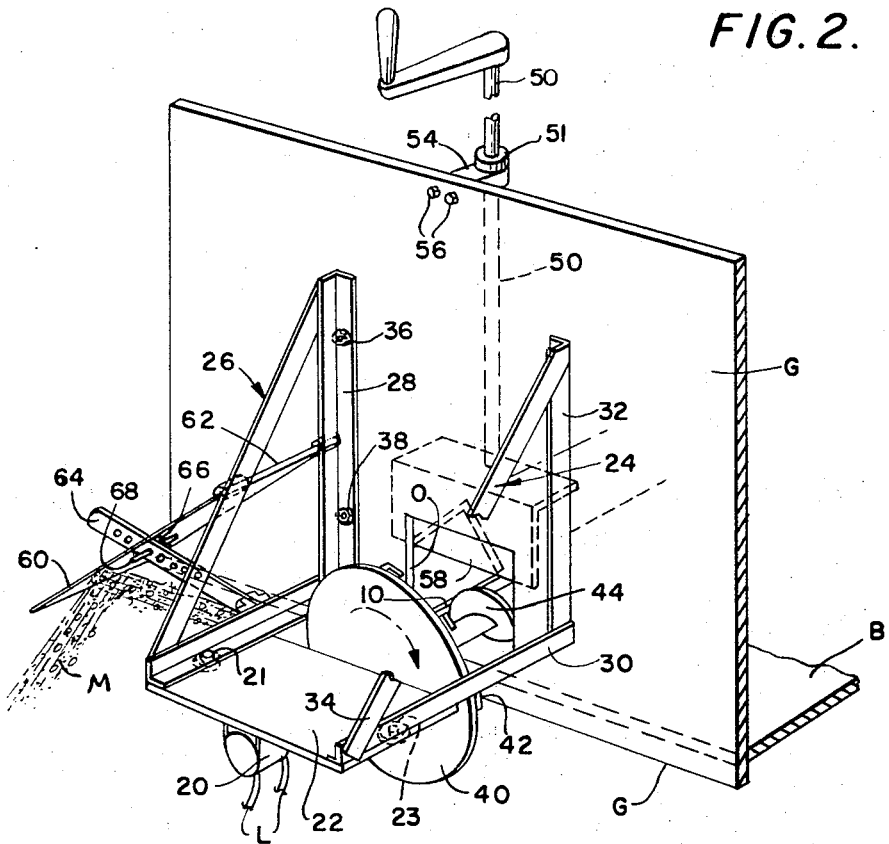
FIG. 2 is an enlarged perspective view showing the rear portion of the spreader assembly and a portion of the bed of the truck body and the tailgate thereof as viewed from a position behind the truck.

An additional adjustable feature of the present structure includes scattering-distance control means comprising a baffle plate 60 which is shown in FIG. 2 and which is hinged at its upper end 62 to the triangular frame 26 and extends down generally below the level of the bottom of the spinner plate 40 so that granular materials M will strike the bottom end of the baffle plate 60 and be deflected downwardly, thereby limiting the elevation angle at which the granular material M can be thrown laterally of the truck. This baffle plate 60 thus makes it possible to limit the distance that the granular material M is thrown from the truck body, thereby confining it to definite traffic lanes. The position of the plate 60 is conveniently controlled by an arm 64 which is hinged to the triangular frame at its lower end and extends through a hole 66 in the plate 60, a pin 68 serving to hold the plate in the position determined by the hole through which the pin passes in the arm 64. The outline of the plate 60 can also be seen in FIG. 1.

In order to achieve ease of installation and removal of the assembly, especially during winter months, certain of the parts are left on the truck body, namely the bracket 54 and the plate 59, and perhaps the triangular frames 24 and 26. The assembly is then removed by disconnecting the hydraulic lines L at the hydraulic pump H, removing the bolts 21 and 23, and pulling the channel 10, shaft 16, and plate 22 with motor 20 and bearing 18 out through the opening O in the tilted tailgate G. The shaft 5 can be raised in the bracket 56 as it is unscrewed from the angle plate 58 so that the latter can also be taken out of the truck body.

The present invention is not to be limited to the exact form illustrated in the drawings for obviously changes can be made therein within the scope of the following claims:

I claim:

1. A granular material spreader assembly to be attached to a truck of the type having a body including a material-receiving bed closed at its rear by a tailgate having a chute opening therethrough, comprising:
    a. an upwardly opening channel member extending lengthwise of the body and protruding through the tailgate opening;
    b. a shaft journaled in the channel member and having an auger thereon operative when the shaft is rotated to advance granular material carried in the truck body rearwardly through the chute opening;
    c. a material slinger plate fixed to the shaft adjacent to the protruding rear end of the channel member and operative when the shaft is rotated to sling material transversely of the truck;
    d. a motor coupled to rotate the shaft; and
    e. means for removably securing the spreader assembly to the truck body including means operative when the tailgate is closed substantially against the body for preventing withdrawal of the channel member from the bed through the chute opening.

2. The spreader assembly as set forth in claim 1, further including plate means fixed to the front of the body for receiving and locating the front of the channel member, and strip means fixed below the channel member and lying against the rear edge of the truck bed, whereby the tailgate holds the strip means against said edge when the tailgate is in said closed position.

3. The spreader assembly as set forth in claim 1, further including an inverted elongated cover member extending longitudinally above the channel member within the truck body so that said material can only reach the auger by passing through the spaces between the cover member and the channel member on both sides thereof, and means for adjusting the heights of said spaces by raising or lowering said cover member with respect to said channel member.

4. The spreader assembly as set forth in claim 3, wherein the elongated cover member has a bracket fixed to its rear end, the bracket having a vertical portion disposed to overlie and close the chute opening in the tailgate and having a horizontal portion disposed near the tailgate, and a rod vertically journaled on the tailgate and having a lower threaded end engaging a threaded bore in the horizontal portion of said bracket, whereby when the rod is rotated the rear end of the cover member is raised or lowered.

5. The spreader assembly as set forth in claim 1, wherein said shaft extends beyond the rear surface of said tailgate when closed and said motor is attached to the rear end of said shaft, frame means attached to the rear surface of said tailgate and extending rearwardly near the motor, and detachable means for securing the motor to the frame means when the tailgate is closed.

6. The spreader assembly as set forth in claim 1, further including a baffle plate carried by the tailgate and extending diagonally downwardly opposite the slinger plate so that material discharged from the plate will tend to strike the baffle plate and be redirected downwardly, the position of the baffle plate being adjustable with respect to the discharge path of said material, whereby to control the distance that said material will be spread transversely of the truck.

7. The spreader assembly as set forth in claim 1, further including hydraulic pump means driven by a prime mover member whose rotation rate is proportional to the speed of the truck, and said motor comprising an hydraulic motor connected to be driven by said pump means at a rate which varies with the rotation rate of the pump means.

* * * * *